US012171175B2

(12) United States Patent
Storey

(10) Patent No.: US 12,171,175 B2
(45) Date of Patent: Dec. 24, 2024

(54) INDEXING PLANTS IN TWO-DIMENSIONAL AND THREE-DIMENSIONAL SPACE IN A CONTROLLED GROWING ENVIRONMENT

(71) Applicant: MJNN LLC, South San Francisco, CA (US)

(72) Inventor: Nathaniel R. Storey, Laramie, WY (US)

(73) Assignee: MJNN LLC, South San Francisco, CA (US)

( * ) Notice: Subject to any disclaimer, the term of this patent is extended or adjusted under 35 U.S.C. 154(b) by 381 days.

(21) Appl. No.: 17/416,495

(22) PCT Filed: Dec. 20, 2019

(86) PCT No.: PCT/US2019/068154
§ 371 (c)(1),
(2) Date: Jun. 20, 2021

(87) PCT Pub. No.: WO2020/132634
PCT Pub. Date: Jun. 25, 2020

(65) Prior Publication Data
US 2022/0039340 A1     Feb. 10, 2022

Related U.S. Application Data

(60) Provisional application No. 62/784,177, filed on Dec. 21, 2018.

(51) Int. Cl.
*A01G 9/04*     (2006.01)
*A01G 31/04*     (2006.01)

(52) U.S. Cl.
CPC ............. *A01G 9/042* (2013.01); *A01G 31/04* (2013.01)

(58) Field of Classification Search
CPC .......... A01G 31/02; A01G 31/04; A01G 9/02; A01G 9/042
See application file for complete search history.

(56) References Cited

U.S. PATENT DOCUMENTS 4,476,651 A    10/1984    Drury
4,932,158 A *   6/1990    Roberts ................ A01G 31/047
                                                   47/64

(Continued)

FOREIGN PATENT DOCUMENTS

CN       104396474 A    *    3/2015
CN       104488594 A    *    4/2015

(Continued)

OTHER PUBLICATIONS

PCT International Search Report and Written Opinion mailed Mar. 10, 2020; in patent application No. PCT/US2019/068154, 9 pgs.

(Continued)

*Primary Examiner* — Magdalena Topolski
*Assistant Examiner* — Katherine Anne Kloecker
(74) *Attorney, Agent, or Firm* — Almanac IP Advisors LLP

(57) ABSTRACT

A crop production system for a controlled plant growing environment is provided. A first assembly comprises a first sub-assembly that itself comprises a first plurality of arms radiating outward from a central portion, wherein each arm is separated from two adjacent arms of the first plurality of arms by respective angles, each arm has a first end proximal to the central portion and a second end distal to the central portion, and each arm is configured to support a plurality of plant growth modules. The plurality of plant growth modules may be moved in a first direction miming from the first end to the second end of each arm of the first plurality of arms.

16 Claims, 5 Drawing Sheets

(56) References Cited

U.S. PATENT DOCUMENTS

| | | | | |
|---|---|---|---|---|
| 8,484,890 | B2* | 7/2013 | Simmons | A01G 31/06 47/62 A |
| 8,756,860 | B1 | 6/2014 | Murphy | |
| 10,206,344 | B2* | 2/2019 | Bryan, III | A01G 9/023 |
| 10,842,084 | B2* | 11/2020 | Brusatore | A01G 9/249 |
| 10,849,288 | B2* | 12/2020 | Deforche | A01G 9/143 |
| 11,310,976 | B1* | 4/2022 | Cross | A01G 7/045 |
| 2012/0240458 | A1* | 9/2012 | Ganske | A01G 9/00 137/561 A |
| 2013/0305601 | A1* | 11/2013 | Park | A01G 9/14 47/17 |
| 2015/0296726 | A1 | 10/2015 | Higgins | |
| 2015/0342133 | A1 | 12/2015 | Nakajima et al. | |
| 2017/0055460 | A1 | 3/2017 | Brusatore | |
| 2017/0231175 | A1 | 8/2017 | Galonska et al. | |
| 2018/0014485 | A1 | 1/2018 | Whitcher et al. | |
| 2018/0014486 | A1 | 1/2018 | Creechley et al. | |
| 2018/0084738 | A1* | 3/2018 | Kuo | A01G 9/143 |
| 2018/0352754 | A1 | 12/2018 | Brusatore et al. | |
| 2019/0191048 | A1 | 6/2019 | Nakayama | |
| 2024/0023502 | A1 | 1/2024 | Kim et al. | |

FOREIGN PATENT DOCUMENTS

| | | | |
|---|---|---|---|
| CN | 106034773 | A * | 10/2016 |
| CN | 106231892 | A | 12/2016 |
| CN | 108207605 | A | 6/2018 |
| CN | 108207605 | B | 1/2020 |
| EP | 1407987 | A1 | 4/2004 |
| GB | 2220551 | A | 1/1990 |
| JP | H0614663 | A | 1/1994 |
| KR | 20160027725 | A * | 3/2016 |
| NL | 8502774 | A | 5/1987 |
| WO | 2018035314 | A1 | 2/2018 |
| WO | 2020074861 | A1 | 4/2020 |
| WO | 2020132634 | A1 | 6/2020 |

OTHER PUBLICATIONS

PCT International Search Report and Written Opinion mailed Oct. 14, 2021; in patent application No. PCT/US2021/038504, 13 pgs.

English Translation of Chinese Office Action mailed Apr. 18, 2023; in patent application No. 201980091327.5, 9 pgs.

English Translation of Chinese Office Action mailed Nov. 10, 2022; in patent application No. 201980091327.5, 9 pgs.

European Extended Search Report mailed Aug. 2, 2022 in EP Application No. 19899000.4, 9 pages.

Canadian Office Action mailed Apr. 4, 2024 in CA Application No. 3,125,604, 7 pages.

Non-Final Office Action mailed Jun. 14, 2024 in U.S. Appl. No. 18/001,573, 11 pgs.

Christ Bastiaansen et al., Translation of Netherlands Patent Application 8502774 filed Oct. 10, 1985, 13 pages.

* cited by examiner

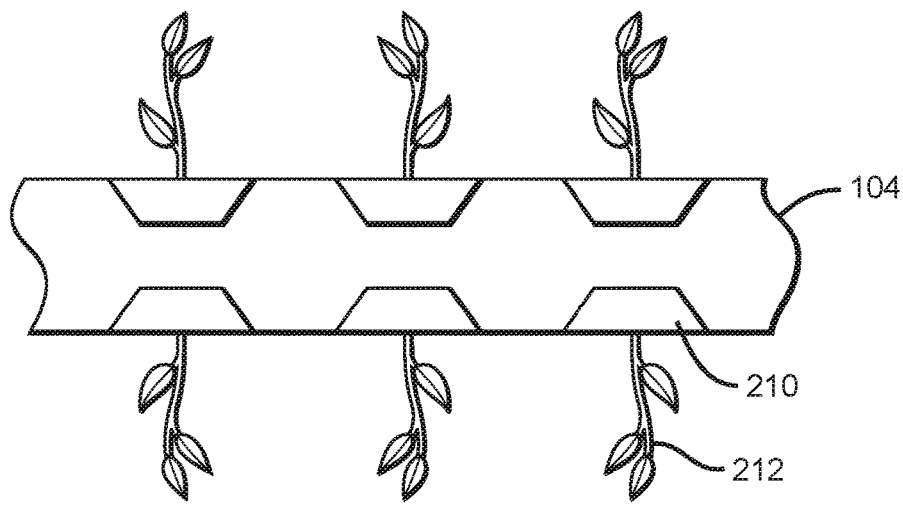
FIG. 3A
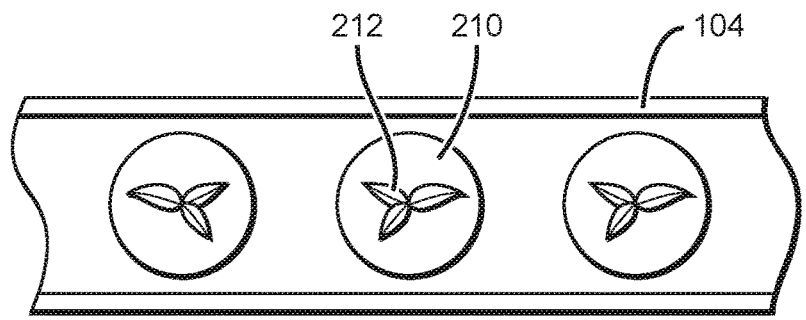
FIG. 3B
FIG. 4
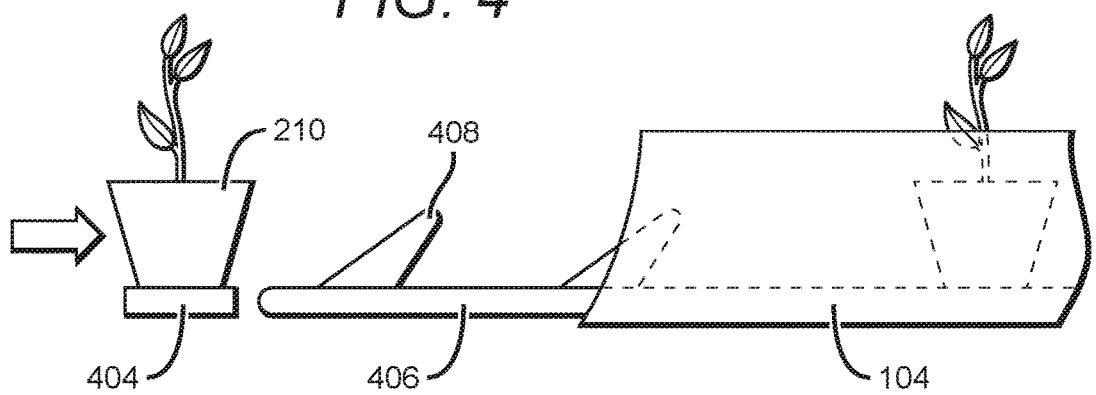

INDEXING PLANTS IN TWO-DIMENSIONAL AND THREE-DIMENSIONAL SPACE IN A CONTROLLED GROWING ENVIRONMENT

CROSS-REFERENCE TO RELATED APPLICATIONS

This application is a United States national stage entry of International Application No. PCT/US2019/068154, filed Dec. 20, 2019, which claims the benefit of priority of US Provisional Patent Application No. 62/784,177, filed Dec. 21, 2018, and is related to US Patent Application Publication No. 2018/0014486, filed Sep. 28, 2016, assigned to the assignee of the present disclosure, all of which are incorporated by reference in their entirety herein.

FIELD OF THE DISCLOSURE

The disclosure relates generally to the field of indoor agriculture, and in particular to the automated handling of plants in a controlled growing environment.

BACKGROUND

During the twentieth century, agriculture slowly began to evolve from a conservative industry to a fast-moving high-tech industry. Global food shortages, climate change and societal changes drove a move away from manually-implemented agriculture techniques toward computer-implemented technologies. In the past, and in many cases still today, farmers only had one growing season to produce the crops that would determine their revenue and food production for the entire year. However, this is changing. With indoor growing as an option and with better access to data processing technologies, the science of agriculture has become more agile. It is adapting and learning as new data is collected and insights are generated.

Advancements in technology are making it feasible to control the effects of nature with the advent of "controlled indoor agriculture." Improved efficiencies in space utilization, lighting, and a better understanding of hydroponics, aeroponics, crop cycles, and advancements in environmental control systems have allowed humans to better recreate environments conducive for agriculture crop growth with the goals of greater yield per square foot, better nutrition and lower cost.

US Patent Publication Nos. 2018/0014485 and 2018/0014486, both assigned to the assignee of the present disclosure and incorporated by reference in their entirety herein, describe environmentally controlled vertical farming systems. The vertical farming structure (e.g., a vertical column) may be moved about an automated conveyance system in an open or closed-loop fashion, exposed to precision-controlled lighting, airflow and humidity, with ideal nutritional support.

Those applications recognize that the growth modules in the columns holding the plants may be spaced at increasing intervals as the plants grow over time. Conventional systems allow for column structures to be moved in a single dimension over the course of the plants' growth cycle. Any other spacing is typically accomplished manually or increasingly with automation.

US Patent Pub. No. US 2017/0055460 ("Brusatore") describes a system for continuous automated growing of plants. A vertical array of plant supporting arms extends radially from a central axis. Each arm includes pot receptacles which receive the plant seedling, and liquid nutrients and water. The potting arms are rotated beneath grow lamps and pollinating arms. However, the spacing between plants appears to be fixed.

SUMMARY OF THE DISCLOSURE

Embodiments of the disclosure provide a mechanical framework and methodology to allow two- and three-dimensional indexing (i.e., movement to a new position) of plants in a grow space. Indexing plants in a single dimension has been possible for some time through walking-beam conveyance of nutrient film technique ("NFT") troughs in greenhouses. This has been useful for spacing the plants apart as they grow, thereby increasing light interception, and, through variable spacing, increasing efficient usage of greenhouse space. Two-dimensional indexing, however, has not been implemented in greenhouse production because of the mechanical complexity of moving individual plants apart along two perpendicular axes. Embodiments of the disclosure enable use of a single mechanism to index in two or three dimensions.

US Patent Pub. No. US 2017/0055460 ("Brusatore") describes a vertical array of plant supporting arms extending radially from a central axis. Each arm has a plurality of pot receptacles. The potting arms are rotated beneath grow lamps and pollinating arms. Unlike the embodiments of the present disclosure, however, Brusatore does not teach moving the individual plants along the arms. It also does not teach the three-dimensional arrangement of embodiments of disclosure, as well as many other features of disclosed embodiments.

Embodiments of the disclosure comprise arrays of arms radially originating from a single, central area of the growing space. The radial arms in an array may circumscribe all or part of a circle, assuming the arms have the same length. The arms may be embodied in forms including gutters, troughs, rails, channels, or combinations thereof. (A skilled artisan will recognize that some of these terms may be used synonymously.) In two dimensions, each array may be positioned in the horizontal plane (x,y axes), in the vertical plane (y,z axes), or in any other plane.

In three dimensions, the arrays may be stacked in parallel with respect to each other, as in a pancake stack formation, according to embodiments of the disclosure. When stacked, the envelope of the arrays may form all or a section of a cylinder, assuming the arms have the same length. In alternative embodiments in three dimensions, the arrays may be arranged at angles with respect to each other, with the spacing between arrays increasing as a function of distance from the central area.

In embodiments, the arms are arrayed in a vertical plane with arms arranged one over another in the vertical plane. Plants in containers, bags or some contained medium may rest on their sides, facing outward, with plants growing out from either side of the plane. These plants may each be individually indexed along the gutter in a way that causes the plants to spread apart longitudinally with the gutters arranged to spread apart over space, e.g., as radii of a circle. According to embodiments of the disclosure, a single mechanism indexes the plants along the arms, but creates movement that separates the plants in two dimensions because of the increased spacing between the variable angle gutters. This mechanism can be applied to growing on the horizontal plane as well, in single or multiple layers, to provide a ray-type layout.

According to embodiments of the disclosure, gutters spread apart from the area of origination (e.g., a central area near the mouths of the gutters), with spacing matching the growth rate or increasing diameter of the plant head/crown of the intended crop as it grows. The anticipated growth rate as well as the rate of indexing sets the angle of a gutter in relation to the gutters adjacent to it. For arrays arranged in the vertical plane, grow lights may be placed in between planes of production to ensure that the crops receive even light over the course of cultivation. For arrays arranged in the vertical plane, the plants may utilize overhead or under-canopy lighting or some combination thereof for growth. For arrays in the horizontal plane, lighting placement and orientation may be used according to crop and growth objectives.

Two-dimensional indexing enables growers to concentrate their lighting and environmental controls on a growing plane at a density sufficient to improve Leaf Area Index (LAI) substantially above that of one-dimensional indexing. Gutters may be spaced specifically to maximize LAI over the course of the plant's life—with the increasing distance between gutters and between plants within gutters adjusted during the growth cycle (e.g., on a daily basis equal to that plant's daily growth). According to embodiments of the disclosure, LAI is used as a surrogate for Light Interception Efficiency (LIE). Alternatively, embodiments may employ LIE itself or a similar metric for canopy coverage as the metric of interest.

Systems without indexing typically have an LAI of approximately 30%, meaning that only 30% of the light emitted or square footage of the growing surface is actually being intercepted by the plant. This is a huge waste of space and energy. Systems that index in a single dimension (1-D) may achieve an LAI of 50-60% if well managed. This still means that 50% to 40% of energy and space resources are being wasted. Two-dimensional indexing according to embodiments of the disclosure enables systems to approach 100% light interception efficiency, i.e., an LAI of around 1.0 for crops that have historically been cultivated at low LAI values. This indicates that energy costs (both lighting and associated HVAC costs) may be reduced by 40-70% for some indoor crops compared to previous non-indexing and 1-D indexing systems.

Embodiments of the disclosure provide a crop production system for an indoor farm. A first assembly, such as a two-dimensional radial array, includes a first sub-assembly that itself includes a first plurality of arms radiating outward from a central portion. For a horizontal array of arms, for example, the central portion may include an elevator to lift plant growth modules to the mouths of the arms of the array. The array may lie in a plane, such as the horizontal plane or the vertical plane.

Each arm may be configured to support plant growth modules. According to embodiments of the disclosure, an arm may be a single channel gutter having one longitudinal opening to allow for plant growth from the plant growth modules supported by the arm. According to embodiments of the disclosure, an arm may be a dual-channel gutter having two longitudinal openings at different lateral positions of the arm to allow for plant growth from the plant growth modules supported by the arm.

Each arm may be separated from two adjacent arms of the first plurality of arms by respective angles. The angles between adjacent arms may depend at least in part upon expected growth rate of plants in the plant growth modules. Each arm may have a first end proximal to the central portion and a second end distal to the central portion. The first ends may be adjacent to a planting/loading zone in which plant growth modules are stationed for loading into the arm. The second end may be adjacent to a harvest zone that receives plant growth modules exiting the arm.

According to embodiments of the disclosure, an indexing mechanism moves the plant growth modules in a first direction running from the first end to the second end of each arm of the first plurality of arms. The mechanism may increase spacing in the first direction along each arm between adjacent plant growth modules supported by the arm. Spacing between adjacent plant growth modules may be set according to a non-decreasing function of distance from the central portion.

According to three-dimensional embodiments of the disclosure, the first assembly comprises two or more sub-assemblies, including the first sub-assembly. Each sub-assembly of includes a respective set of arms (e.g., a radial 2-D array) radiating outward from the central portion. Each arm is separated from two adjacent arms of the same set of arms by respective angles. According to embodiments of the disclosure, each set of arms of the first assembly lies in a plane parallel to an adjacent set of arms of the first assembly. Assuming the arms have the same length, this first assembly may have the shape of a section of a cylinder or a stack of pancakes.

According to other three-dimensional embodiments of the disclosure, the sets of arms do not lie in parallel to each other. Instead, each set of arms of the first assembly lies in a respective plane of a first set of planes. The first set of planes radiate outward at different angles with respect to a longitudinal dimension of the central portion. In embodiments where the arms lie in horizontal planes and radiate outward from a vertical central portion, a first plane may lie horizontally; a second, adjacent plane may lie in a plane below the first plane, tilted down at an angle from the first plane; and a third, plane, adjacent to the second plane, may lie in a plane below the second plane, tilted down at an angle from the second plane, and so on. Assuming the arms have the same length, the first assembly according to these embodiments may have the shape of a spherical section.

The structure of embodiments of the disclosure enable increased efficiency in the use of the grow space. The first assembly may be positioned in a complementary manner with respect to a similar or identical second assembly structure to take advantage of empty space that remains adjacent to the first assembly. As examples, the first and second assemblies may be disposed side-by-side, or vertically one on top of the other.

According to embodiments of the disclosure, the second assembly may include at least two sub-assemblies, where each sub-assembly comprises a respective set of arms radiating outward from a second central portion. Each arm of each set of arms of the second assembly has a first end proximal to the second central portion and a second end distal to the second central portion. To achieve complementary positioning according to embodiments of the disclosure, the second central portion is disposed proximal to the second ends of the arms of the first assembly and distal to the central portion of the first assembly. Each set of arms of the second assembly may lie in a respective plane of a second plurality of planes. The second plurality of planes radiate outward at different angles with respect to a longitudinal dimension of the second central portion.

According to embodiments of the disclosure, the indexing mechanism may move a plurality of plant growth modules in a respective direction running from the first end to the second end of each arm of each plurality of arms. For each arm, the mechanism may increase spacing along a longitudinal dimension of the arm between adjacent plant growth modules. Spacing between the adjacent plant growth modules may be a non-decreasing (e.g., increasing) function of distance from the first end of the arm. The indexing mechanism may include a walking beam mechanism, a push-pull bar mechanism, or other indexing mechanisms known in the art. According to embodiments of the disclosure, as the mechanism moves the plant growth modules along an arm, the plant growth modules pass through different environmental conditions.

BRIEF DESCRIPTION OF THE DRAWINGS

FIGS. 3A and 3B are top cross-sectional and side views, respectively, of an indexing arm, according to embodiments of the disclosure.

FIG. 4 is a side cross-sectional view illustrating a mechanism for loading a plant growth module into the first end of an arm, and indexing the plant growth module through the arm, according to embodiments of the disclosure.

DETAILED DESCRIPTION

The present description is made with reference to the accompanying drawings, in which various example embodiments are shown. However, many different example embodiments may be used, and thus the description should not be construed as limited to the example embodiments set forth herein. Rather, these example embodiments are provided so that this disclosure will be thorough and complete. Various modifications to the exemplary embodiments will be readily apparent to those skilled in the art, and the generic principles defined herein may be applied to other embodiments and applications without departing from the spirit and scope of the disclosure. Thus, this disclosure is not intended to be limited to the disclosed embodiments, but is to be accorded the widest scope consistent with the principles and features disclosed herein.

Figure 1:
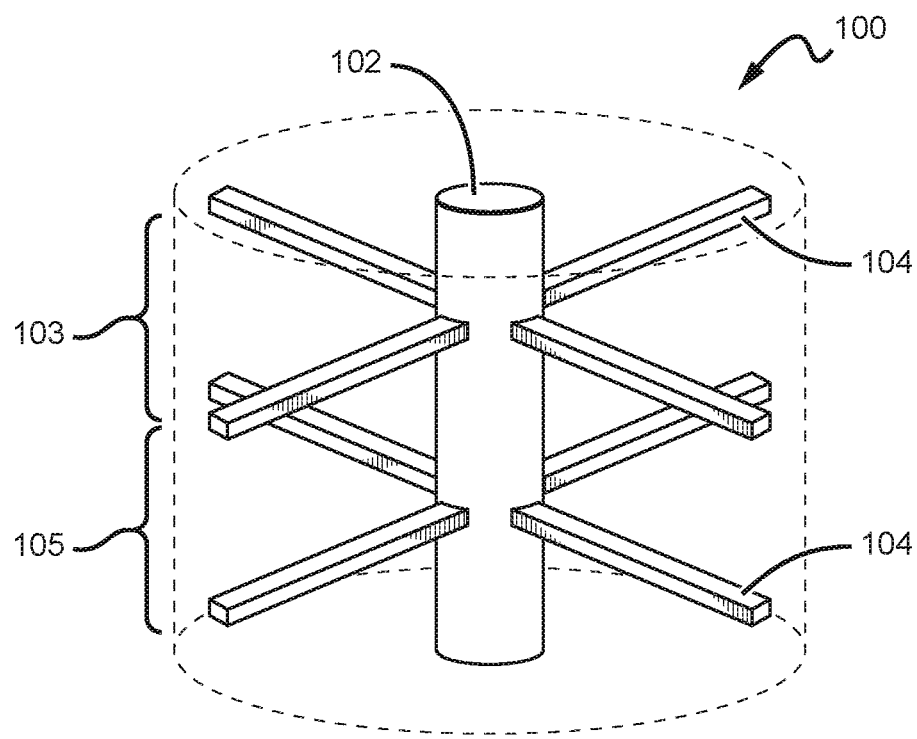
FIG. 1 illustrates a perspective view of a system for indexing plants in a controlled growing environment, according to embodiments of the disclosure.

FIG. 1 illustrates a perspective view of a system 100 for indexing plants in a controlled growing environment, according to embodiments of the disclosure. The system includes a central portion 102 from which radiate sub-assemblies 103, 105 of indexing arms 104 (otherwise referred to herein as "sets" of arms). Each sub-assembly 103, 105 of arms 104 may be arranged in a first plane, such as a horizontal plane, as shown in the figure. Each sub-assembly 103, 105 of arms itself is employed in two-dimensional indexing, according to embodiments of the disclosure. The pancake-like stack of sub-assemblies 103, 105 of arms is employed in three-dimensional indexing, according to embodiments of the disclosure. Depending upon space limitations, each arm assembly in any of the two-dimensional or three-dimensional embodiments described herein may include a greater number of sub-assemblies.

Each indexing arm supports plant growth modules, according to embodiments of the disclosure. A plant growth module may include a plant growth medium and a plant, according to embodiments of the disclosure. Alternatively, or in addition, a plant growth module may include a receptacle (e.g., a pot) for holding a plant growth medium and a plant, according to embodiments of the disclosure. According to embodiments of the disclosure, a plant growth module includes: an enclosure configured to securely hold at least one plant; a drain aperture in the enclosure; and at least one growth opening in the enclosure configured to permit growth of the at least one plant therethrough. The growth module may be configured to support multiple growth modules stacked above or below itself. The drain aperture may be configured to facilitate vertical flow of fluids from the growth module to another growth module stacked below itself. The growth opening may be configured to allow for an airflow to disrupt a boundary layer of an under-canopy of any plants growing away from the growth module.

According to embodiments of the disclosure, each arm 104 has a first end proximal to the central portion and a second end distal to the central portion. For each pair of adjacent arms 104 in a sub-assembly 103 or 105, a distance between the first ends of the pair of adjacent arms is smaller than a distance between the second ends of the pair of adjacent arms, according to embodiments of the disclosure. According to embodiments of the disclosure as shown in FIG. 1, this arrangement is a consequence of the arms 104 radiating outward along radii having their origin at the central portion 102, where each set 103, 105 of arms 104 has a hub-and-spoke arrangement (and a circular envelope profile, assuming the arms have the same length). According to embodiments of the disclosure, each set of arms is separated by an angle with respect to a longitudinal dimension of the central portion 102.

According to embodiments of the disclosure, an indexing mechanism moves the plant growth modules in a first direction running from the first end to the second end of each arm in each set of arms.

According to embodiments of the disclosure, the arms may be supported by uprights or hanging cables and brackets descending or ascending in an array at varying angles from a concentrated planting area to a distributed harvest area. When arranged vertically, arms are stacked above each other so that they resemble the skeleton of a folding fan held vertically. The varying angle of incline or decline causes the arms to have different spacings between each other at the end of their run compared to the beginning. According to embodiments of the disclosure, an elevator (not shown) raises up stacks of seedlings in pots, containers, bags, or other plant growth modules, and loads them into the loading/planting portion of the array via an actuated pusher mechanism. After a plant growth module enters the arm, the indexing mechanism grabs the plant and pushes or pulls it along the arm and into the growing area. As the plants move along the arms they spread apart according the varying angles of incline (in a vertical sub-assembly) of the gutters. Plants in the other plant growth modules may sit on their sides in the arms, facing the aisle on either side of the arm array where the lights may be placed vertically.

According to embodiments of the disclosure, plant production is continuous, with spacings and indexing speed based on, canopy size, growth cycle, single versus multiple harvests, and time required before harvest. Moving the plants past lights can also allow reduced capital expenditures by running the lights constantly. According to embodiments of the disclosure, plants exit an arm at the same rate that they are loaded onto an arm. Treatments (e.g., environmental treatments) to the plants are a function of location along the longitude of the arms.

Figure 2:
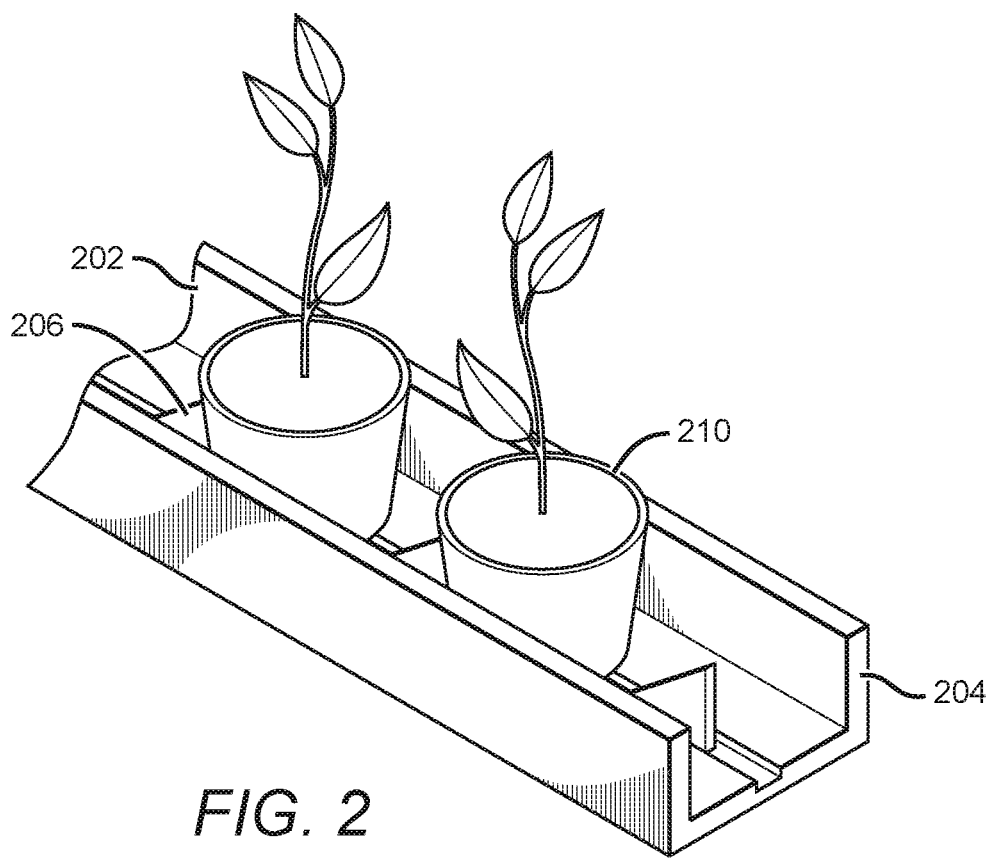
FIG. 2 is a perspective view of an indexing arm, according to embodiments of the disclosure.

FIG. 2 is a perspective view of an indexing arm 104, according to embodiments of the disclosure. As illustrated, the arm is in the form of a gutter. The arm includes a proximal, loading end 202 and a distal, harvesting end 204. The arm may include a walking beam type indexing mechanism, a push/pull grab bar, or other indexing mechanism known in the art. The indexing mechanism includes catches 206. After a plant growth module 210 is loaded onto the arm, the indexing mechanism carries plant growth modules 210 longitudinally down the arm. (Here, longitude runs along the length of the arm.)

According to embodiments of the disclosure in which 2-D indexing is performed in the horizontal plane, the arms may be arranged in the pattern of a folding fan with the arms radiating out in the horizontal plane from a central planting area, using the same indexing methods for moving plants. In this arrangement, however, it may be advantageous to position the plants vertically in the arms FIGS. 3A and 3B are a top cross-sectional view and a side view, respectively, of a dual-channel indexing arm 104, according to embodiments of the disclosure. According to embodiments, each longitudinal channel is disposed on opposing sides of the dual-channel gutter, so as to hold plant growth modules 210 with their seedlings 212 facing in substantially opposite directions.

In embodiments, the arms are positioned in a substantially horizontal direction with the plant seedling growing substantially horizontally out of each side of each arm. To account for gravity, the plant growth modules may be tilted somewhat upward in a lateral direction with respect to the arm by an angle from the horizontal in the range of 0-45 degrees, or 20-30 degrees.

Embodiments of the disclosure employ single-channel gutters, in which case adjacent pots with seedlings can be arranged facing in alternating directions so that a single gutter can create a growing plane/surface of plants on both sides of the gutter.

Gutters may comprise wire-meshes or wire trusses with a linear, or roll-form material. These gutters can be individually extruded or extruded as a single piece, with the structural support rising through a cut out in the center of the extrusion, or with the extrusion supported by brackets for both vertical structural support or cable suspension structures. Generally, each channel accommodates the flow of nutrient solution and the plant roots, as well as to support the plant container, as front lip or support element that defines the lip of the channel, and can form a rest for the side of the plant container if it extends over the edge of the channel. In some application this lip also helps suspend the container over the channel to avoid crushing plant roots as pots are indexed and to aid in drainage. Many channels are designed to allow roots to grow into the nutrient film in the gutter in such a way that the surfaces of the trough that interface with the container is elevated or separated from the film in such a way that the plant roots won't be crushed as individual containers are indexed along the trough.

FIG. 4 is a side cross-sectional view illustrating a mechanism for loading a plant growth module 210 into the first end of an arm 104, and indexing the plant growth module through the arm 104, according to embodiments of the disclosure. An elevator (not shown) in the central portion may lift the plant growth modules 210 on to a loading/staging area 404 located adjacent to the mouth of a radiating arm. An actuator (e.g., a pusher bar) may push the plant growth module to the mouth of the gutter 104. An indexing mechanism 406 (e.g., walking beam, push/pull bar), such as those known in the art, includes catches 408 (e.g., cams or latches) and grabs and pulls each plant growth module into its corresponding gutter, according to embodiments of the disclosure. The mechanism 406 conveys the plant growth module 210 down the arm. Instead of a mechanism such as mechanism 406, embodiments of the disclosure may employ a robotic system (e.g., robot vehicle, robot arm) that has an end effector for grabbing and moving the plant growth modules. As an alternative to a mechanism such as a walking beam, a push-pull bar or a robotic system, the plant growth modules may be conveyed down the arm and positioned (e.g., spaced with respect neighboring modules) by a human. This may be especially economical for slow-growing (e.g., large) plants that do not need frequent indexing.

Indexing may be done on an individual container by container basis using a walking beam, a lightweight push-pull bar with angled catches that can be used as a top cover over the plant growth modules 210, or other mechanisms. Many of these mechanisms take advantage of a push or pull mechanism that uses multiple sections of a bar or a beam joined together with brackets, or with the bars overlapping, to form a connection that travels the distance of the maximum container to container spacing (center to center). This arrangement creates a slack that enables containers to be indexed longitudinally along the entire arm from smaller spacings to larger spacings.

In FIG. 4, a single-channel gutter arm with the plant growth modules 210 sits in a vertical position. In embodiments, the system may employ a similar indexing mechanism for an arm that conveys the plant growth modules in a non-vertical position, or that conveys two or more plant growth modules disposed laterally on opposite sides at each longitudinal position of a dual-channel gutter arm such as that shown and described elsewhere herein. Especially in embodiments in which the plant growth modules are positioned non-vertically, the arm may include a lip or other feature to secure the plant growth module from being tipping into an improper position due to gravity.

Plant growth modules may be planted with seedlings (auto-transplanted) or seeded and pushed into propagation planes where they are cultivated and possibly indexed apart depending on the crop. Seedlings may be moved through the system from seeding to an elevator as the seedlings grow. Once the seedlings are ready to be moved to the larger systems, they may be indexed onto an elevator or onto a conveyor and moved to the origin point of the array of indexing arms.

As shown in FIG. 4, after the plant growth module is aligned with the mouth of the indexing arm (e.g., gutter), a pusher bar may push the plant growth module into the arm, where a walking beam latch, push/pull bar or other mechanism can grab the plant growth module and pull it into the arm. The plant growth module slides into the arm, with the bottom or side making contact with the nutrient solution, which is introduced at the mouth of the arm. According to embodiments of the disclosure, perforations in the sides and bottom of the container of the plant growth module allow nutrient solution to be wicked into the plant growth module to feed the seedling roots. It also allows plant roots to escape the plant growth module and communicate directly with the nutrient film. As the seedling matures and the canopy fills out, young plants arranged on a plane (vertical or horizontal) will begin to compete with each other for light and $CO_2$. Day by day, the seedlings may be moved further down the arm, with distances increasing between both the seedlings within the trough, as well as between troughs, maintaining high and consistent light interception/LAI values over the growth of the plant. As a plant growth module travels down the arm, it may be irrigated overhead from drippers placed on the same spacing as the plant growth modules, especially once the plants start consuming more and more water and nutrition as fruit is set and plant biomass increases.

The plant growth module travels down the arm, passing different environmental conditions corresponding to different stages of the plant's lifecycle/maturity. Such conditions include, if indexing is fast enough, light and dark, pollination, different types of light (e.g., wavelengths), pruning and cultural practices, and other cultural and environmental treatments. As the plant approaches the end of its lifecycle, it also approaches the end of the arm, eventually being pushed onto an elevator or a conveyor at the end of the arm, where it may be reoriented and moved to mechanical or manual harvesting areas/equipment.

Three-Dimensional Indexing

Figure 5A:
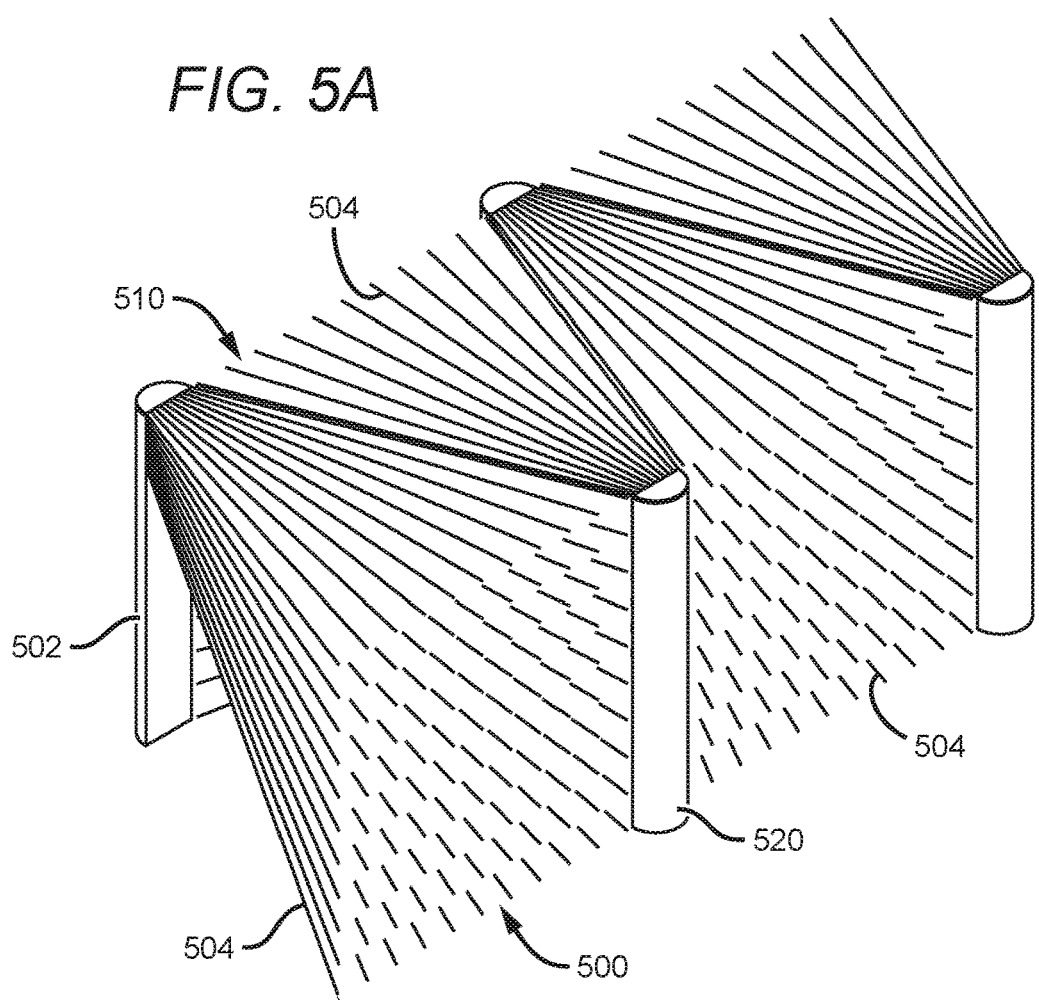
FIGS. 5A, 5B and 5C are perspective, top and cross-sectional views, respectively, of a system for indexing plants in a controlled growing environment, according to three-dimensional embodiments of the disclosure.
Figure 5B:
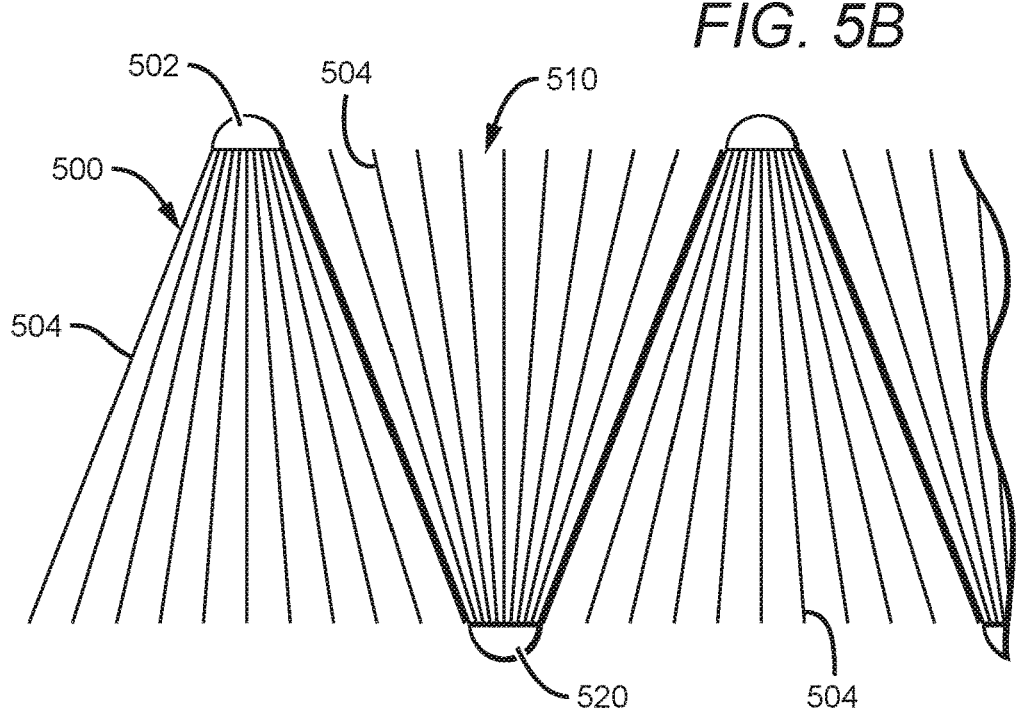
Figure 5C:
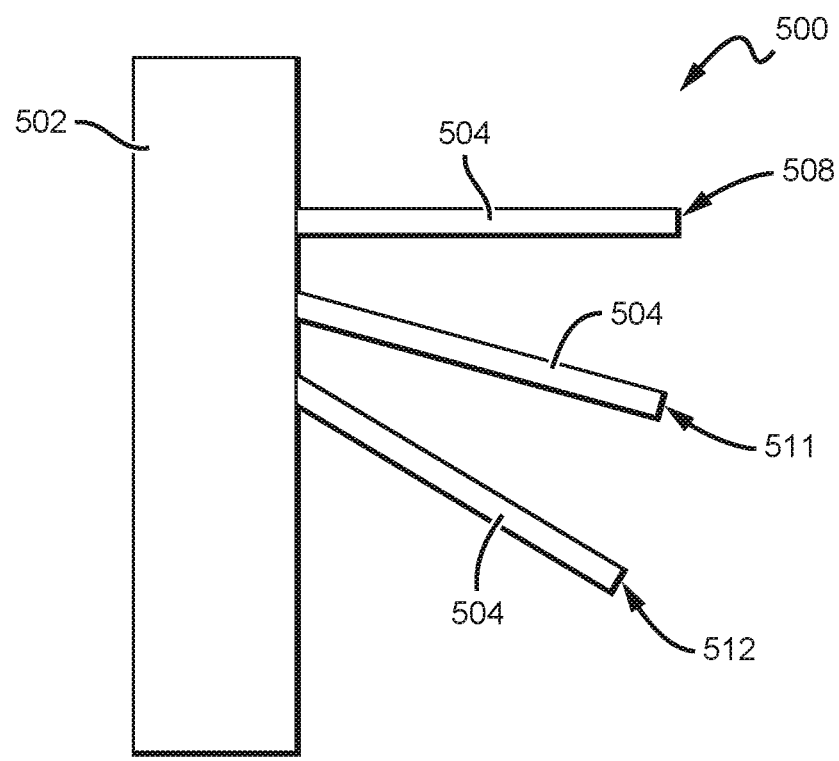

FIGS. 5A, 5B and 5C are perspective, top and cross-sectional views, respectively, of a system for indexing plants in a controlled growing environment, according to other "three-dimensional" embodiments of the disclosure. Unlike the 3-D embodiment of FIG. 1, the sub-assemblies of arms are not arranged parallel to each other. FIGS. 5A and 5B (and 6) illustrate how two or more 3-D assemblies may be fitted together to efficiently occupy the grow space.

Referring to the cross-sectional view of FIG. 5C, an assembly 500 includes a central portion 502 (which may include an elevator or other conveyor mechanism) from which radiate indexing arms 504, each for supporting plant growth modules. A first sub-assembly 508 includes a first set of arms 504. A second sub-assembly 511 includes a second set of arms 504. A third sub-assembly 512 includes a third set of arms 504. Arms 504 may be identical or similar to arms 104 in other embodiments. Arms 504 within or in different sub-assemblies may be identical or similar to each other. Each arm of each set of arms has a first end proximal to the central portion 502 and a second end distal to the central portion 502.

According to embodiments of the disclosure, each set of arms 504 within a sub-assembly may be arranged in their own plane. As shown in the figure, the sub-assemblies radiate outward at different angles with respect to a longitudinal dimension of the central portion 502.

Also, according to embodiments of the disclosure and similar to the arrangement of sub-assembly 103 shown in FIG. 1, for each pair of adjacent arms in each set of arms (which may rest in a plane) within a sub-assembly, a distance between the first ends of the pair of adjacent arms is smaller than a distance between the second ends of the pair of adjacent arms, according to embodiments of the disclosure. The arms 504 in each sub-assembly may describe a circular profile in a plane (assuming the arms 504 have the same length). The arms within each sub-assembly are separated by respective angles from each other.

According to embodiments of the disclosure, for each arm 504 of the first sub-assembly 508 and a corresponding arm of the second sub-assembly 511 that has a nearest neighboring first end, a distance between {(a) the first end of the arm of the first sub-assembly 508 and (b) the first end of its corresponding arm of the second sub-assembly 511} is smaller than a distance between {(c) the second end of the arm of the first sub-assembly 508 and (d) the second end of its corresponding arm of the second sub-assembly 511}.

Similarly, for each arm of the second sub-assembly 511 and a corresponding arm of the third sub-assembly 512 having a nearest neighboring first end, a distance between {(a) the first end of the arm of the second sub-assembly 511 and (b) the first end of its corresponding arm of the third sub-assembly 512} is smaller than a distance between {(c) the second end of the arm of the second sub-assembly 511 and (d) the second end of its corresponding arm of the third sub-assembly 512}.

In embodiments, two adjacent sub-assemblies each lie in their own plane, and radial arms in one plane and their respective, nearest radial arms in the adjacent plane each lie in the same plane perpendicular to the planes of the adjacent sub-assemblies. For example, arms lying in a horizontal plane may lie directly above the arms in another plane that is angled away from the horizontal plane. In other embodiments, two adjacent sub-assemblies each lie in their own plane, and radial arms in one plane are circumferentially staggered with respect to radial arms in the other plane. In such embodiments, the second ends of the arms in one plane may be arranged to be equidistant from adjacent second ends of the arms in the other plane.

A second arm in a second sub-assembly has a nearest neighboring first end with respect to a first arm in a first sub-assembly if the first end of the second arm is closer to the first end of the first arm than to the first end of any other arms in the first sub-assembly; provided, however, that the following rules may apply to the following exceptions: (1) if the first end of a first arm in a first sub-assembly lies equally close to the first ends of a set of multiple arms in a neighboring sub-assembly, the corresponding arm in the neighboring sub-assembly may be chosen from that set as the arm that also has its second end nearest to the second end of the first arm in the first sub-assembly; and (2) if both the first and second ends of a first arm in a first sub-assembly lie equally close to both the respective first and second ends of a set of multiple arms in a neighboring sub-assembly, the corresponding arm in the neighboring sub-assembly may be arbitrarily selected from the set.

The indexing mechanism for indexing in three dimensions is identical or similar to that for indexing in two dimensions. The arrangement of the assembly in three dimensions, as compared to two dimensions, significantly changes the shape of the occupied space. Whereas the 2-D arm assembly may have a cylindrical envelope, the 3-D arm assembly of the non-parallel array embodiments may have an envelope of a spherical section (e.g., hemisphere, quarter sphere), assuming the arms 504 have the same length as shown in the cross-sectional view of FIG. 5C. If the arms are not of the same length as in FIGS. 5A, 5B and 6, they may circumscribe a different envelope, such as a non-spherical profile.

According to embodiments of the disclosure, plants are managed in two dimensions as already described, but the arms radiate from a single condensed area in space as though arrays of the two-dimensional embodiments are stacked at increasing angles of tilt from the horizontal. According to embodiments of the disclosure, as the plants are indexed along the arms, they are moved apart longitudinally within the gutter by the indexing mechanism, they move apart vertically (as the gutters angle apart from one another in the vertical plane), and laterally (as the gutters angle apart from one another in the horizontal plane). Thus, embodiments of the disclosure provide a single mechanism to index plants apart in three-dimensional space over the course of the lifecycle of the crop. Those skilled in the art will recognize that, although this description is phrased in terms of horizontal and vertical planes, it also applies to sets of arms arranged in different orientations.

Indexing in three dimensions accounts for both the diameter of the plant canopy as well as the height of the canopy. Embodiments of the disclosure accommodate for the fact that some crops grow significantly in height as well as diameter over the course of their lifecycle, and that light management requires a certain distance between the lights and the canopy over the course of the plant's growth and development. Three-dimensional indexing takes this into account, effectively allowing the plant growth module to be moved away from the lights over the course of a plant's life to maintain a constant distance between the plant canopy and the lighting, according to embodiments of the disclosure. For example, for a set of arms arranged in the vertical plane, the arms may be angled downward to increase the distance between overhead lighting and the plant as it grows in height and matures.

This feature of embodiments of the disclosure increases the efficient use of space, allowing crops with large differences in canopy height over their growth cycle to conserve space when the plants are small. Indexing in a third dimension can result in space savings between 15%-50% compared to two-dimensional embodiments, as well as light interception efficiencies (LIE) in the same range of improvement. The ability to move plants apart vertically, laterally, and horizontally means that the production environment can become truly dynamic, accommodating crops with aggressive growth habits, large growth habits or other features that result in inefficiencies in less dynamic production methods. This ultimately can reduce the cost of production indoors by significant amounts, allowing the industry to continue to improve the economics of indoor production.

Figure 6:
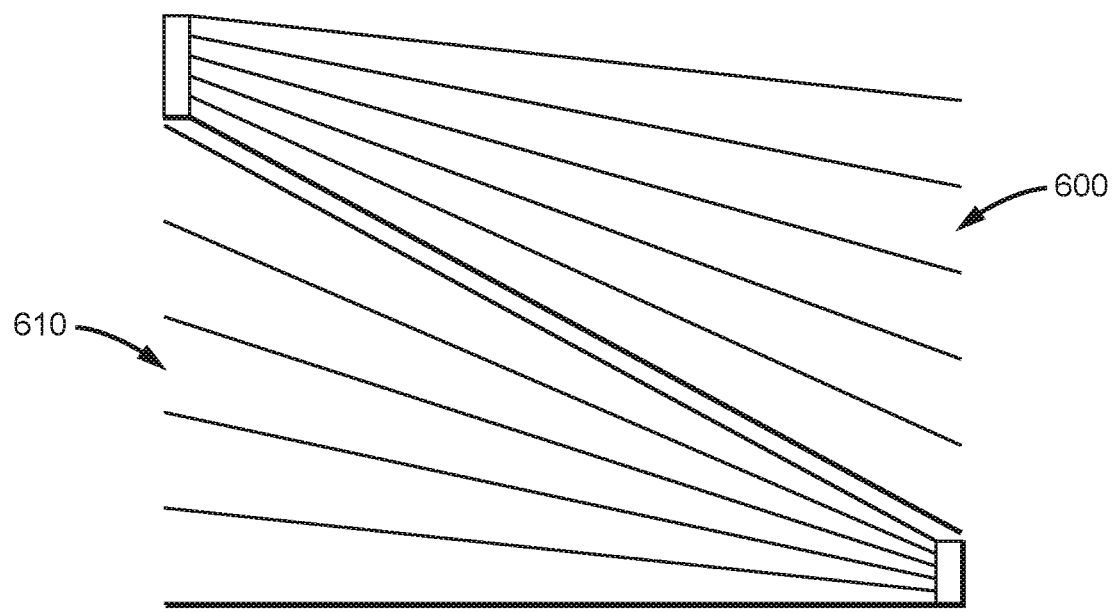
FIG. 6 is a schematic, cross-sectional diagram illustrating how three-dimensional embodiments of the disclosure may be arranged in a complementary manner to efficiently use the space of an indoor farm.

FIGS. 5A, 5B and 6 illustrate how three-dimensional embodiments of the disclosure may be arranged in a complementary manner to efficiently use the space of an indoor farm. According to embodiments of the disclosure, a first assembly 500 (600 in FIG. 6) of arrays may be positioned in a complementary manner with respect to a similar or identical second assembly structure 510 (610 in FIG. 6) to take advantage of empty space that remains adjacent to the first assembly 500 (600 in FIG. 6). As examples, the first and second assemblies may be disposed side-by-side as in FIGS. 5A and 5B, or vertically one on top of the other as in FIG. 6.

According to embodiments of the disclosure, like the first assembly 500, the second assembly 510 may include at least two sub-assemblies, where each sub-assembly comprises a respective set of arms radiating outward from a second central portion 520. Each arm of each set of arms of the second assembly 510 has a first end proximal to the second central portion 520 and a second end distal to the second central portion 520. To achieve complementary positioning according to embodiments of the disclosure, the second central portion 520 is disposed proximal to the second ends of the arms of the first assembly 500 and distal to the central portion 502 of the first assembly 500. Each set of arms of the second assembly may lie in a respective plane of a second plurality of planes, in which case the second plurality of planes radiate outward at different angles with respect to a longitudinal dimension of the second central portion.

In the cross-sectional view of FIG. 6, top, first assembly 600, similar to assembly 500, is arranged with non-parallel sub-assemblies of indexing arm arrays, as disclosed in three-dimensional embodiments above. Bottom, second assembly 610 is positioned in a complementary, inverted manner underneath the top assembly 600. Whereas the arms of the top assembly 600 radiate downward from their loading to harvesting ends, the arms of the bottom assembly 610 radiate upward from their loading to harvesting ends.

Figure 7:
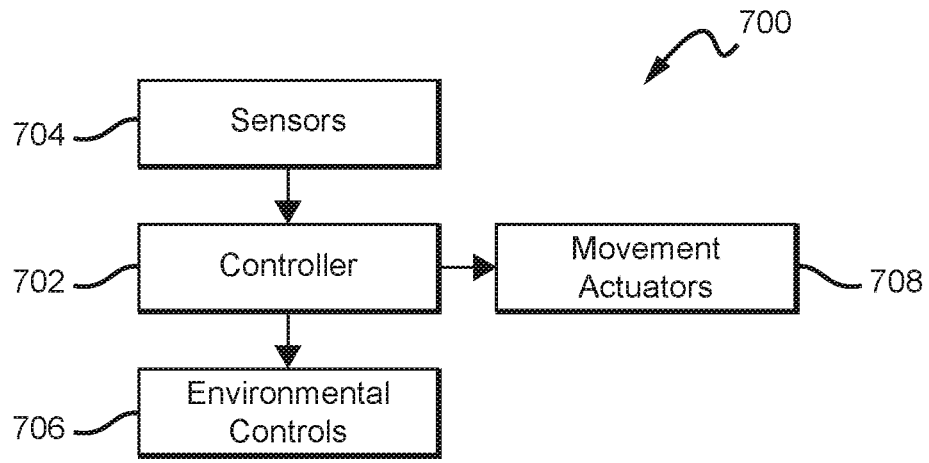
FIG. 7 illustrates a control system for indexing plants in a controlled growing environment, according to embodiments of the disclosure.

FIG. 7 illustrates a control system 700 for indexing plants in a controlled growing environment, according to embodiments of the disclosure. A controller 702 receives information concerning environmental parameters, such as temperature, humidity, growth medium moisture, and $CO_2$ level, from sensors 704 placed in different areas of the growth environment. In response to that information, the controller may instruct environmental controls 706 to adjust environmental parameters such as temperature and irrigation level.

The controller also controls movement actuators 708, which may include linear and rotational motors to control motion of the elevator, pusher actuator, and the indexing mechanism to move pots along the arms. Unless otherwise specified herein, the controller controls all operations of the embodiments of the disclosure. The controller may be implemented by one or more local or distributed computing devices, which may each include one or more processors and memory storing instructions for carrying out disclosed operations.

Pots, Bags, Aggregates, and Containers

Plants may be cultivated in pots, bags, polymer bound plugs or aggregates or containers that are pushed onto the trough. These containers may be pushed along the troughs by an indexing mechanism in a variety of orientations. To ensure they are capable of being pushed they should interface with the walking beam or other indexing mechanism. They should also be oriented in a way that supports cultivation, whether, for example, the plant is growing along the horizontal plane or the vertical plane. According to embodiments of the disclosure, the containers should have enough friction with the bottom of a gutter so that they are easily captured by a gravity push/pull bar or similar mechanism.

Depending on the type of container being used, containers can be easily reused by dumping and washing them out, refilling and replanting. Much of the medium may also be reused, reducing the waste from the system and the cost of the intensity of individual containers and a more medium-intensive system. This reduces the operating costs of the facilities as well as the sustainability.

Support Systems

Seedling System: The seedling system comprises containers that are autoseeded and germinated on racks—either vertically or horizontally side by side and at high density. In one embodiment, seeding happens in the space below the troughs (when oriented on the vertical plane, radiating out from a single point) or to the side(s) of the troughs in the space near the origin of the troughs. The containers may be germinated and then stacked or lined up and slowly pushed towards the origin. When the system is oriented in the vertical plane, the containers may be stacked facing sideways (post-germination) on the vertical plane and slowly pushed towards the origin point, either up an incline or to an elevator that ascends to the origin point, or, for troughs that proceed from the origin point up, an incline. Other orientations may make use of space elsewhere, but conveyance of some type is used.

Irrigation System: Containers may be irrigated via solution running down the trough, or via overhead drip, or both depending on the container and crop. If an NFT drip is used, then the tubing with drip emitters or drilled pipe may be hung above the trough, with holes or emitters located on spacings that correspond with the spacing of the containers in the trough below the tubing.

Considerations for Plant and Root Health

Plant health should be excellent in these systems as a function of managing bridging between plants, canopy space and environment and the root zone and nutrition of the plant. This type of a system opens up the opportunity to do supplemented media, and building biologically complex root microbiology while simultaneously managing system microbial activity and species composition. The medium, solution and irrigation rate/type can be matched to crop need and preference.

Planting and Introduction of the Plants

Plants can be seeded in containers as is typical or transplanted depending on the crop. Automatic transplanters can be used to transplant seedlings that are grown in plug trays and then transplanted, such as tomato, cucumbers, peppers and eggplant.

Harvesting and removal of the plants: At the end of the trough plants are conveyed to harvesting areas, where berries are shaken off, tomatoes are cut or shaken off, greens are cut, etc. This allows the harvesting to happen in a centralized and efficient way. It also helps to establish some specific material flow patterns within the facility.

Computer System Implementation

Figure 8:
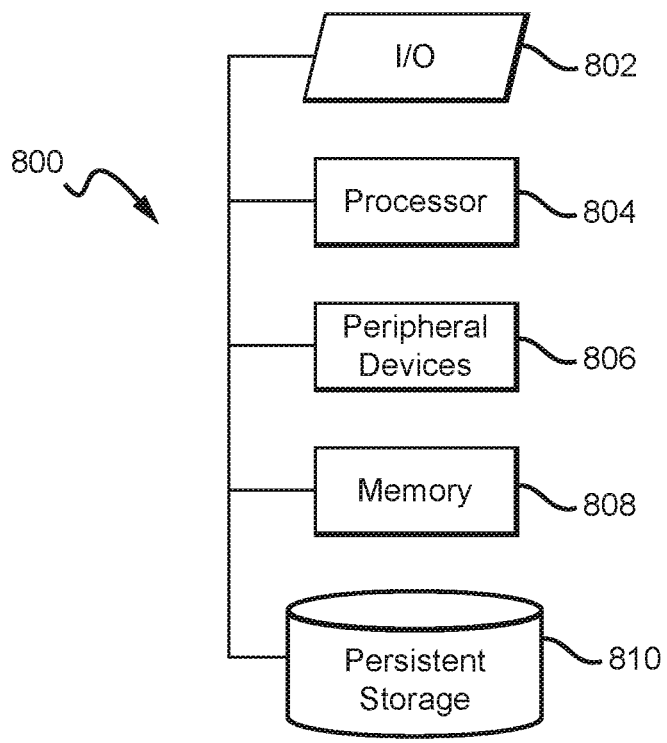
FIG. 8 illustrates an example of a computer system that may be used to execute instructions stored in a non-transitory computer readable medium (e.g., memory) in accordance with embodiments of the disclosure.

FIG. 8 illustrates an example of a computer system 800 that may be used to execute program code stored in a non-transitory computer readable medium (e.g., memory) in accordance with embodiments of the disclosure. The computer system includes an input/output subsystem 802, which may be used to interface with human users or other computer systems depending upon the application. The I/O subsystem 802 may include, e.g., a keyboard, mouse, graphical user interface, touchscreen, or other interfaces for input, and, e.g., an LED or other flat screen display, or other interfaces for output, including application program interfaces (APIs). Other elements of embodiments of the disclosure, such as the controller, may be implemented with a computer system like that of computer system 800.

Program code may be stored in non-transitory media such as persistent storage in secondary memory 810 or main memory 808 or both. Main memory 808 may include volatile memory such as random access memory (RAM) or non-volatile memory such as read only memory (ROM), as well as different levels of cache memory for faster access to instructions and data. Secondary memory may include persistent storage such as solid state drives, hard disk drives or optical disks. One or more processors 804 reads program code from one or more non-transitory media and executes the code to enable the computer system to accomplish the methods performed by the embodiments herein. Those skilled in the art will understand that the processor(s) may ingest source code, and interpret or compile the source code into machine code that is understandable at the hardware gate level of the processor(s) 804. The processor(s) 804 may include graphics processing units (GPUs) for handling computationally intensive tasks.

The processor(s) 804 may communicate with external networks via one or more communications interfaces 807, such as a network interface card, WiFi transceiver, etc. A bus 805 communicatively couples the I/O subsystem 802, the processor(s) 804, peripheral devices 806, communications interfaces 807, memory 808, and persistent storage 810. Embodiments of the disclosure are not limited to this representative architecture. Alternative embodiments may employ different arrangements and types of components, e.g., separate buses for input-output components and memory subsystems.

Those skilled in the art will understand that some or all of the elements of embodiments of the disclosure, and their accompanying operations, may be implemented wholly or partially by one or more computer systems including one or more processors and one or more memory systems like those of computer system 800. In particular, the elements of automated systems or devices described herein may be computer-implemented. Some elements and functionality may be implemented locally and others may be implemented in a distributed fashion over a network through different servers, e.g., in client-server fashion, for example.

Although the disclosure may not expressly disclose that some embodiments or features described herein may be combined with other embodiments or features described herein, this disclosure should be read to describe any such combinations that would be practicable by one of ordinary skill in the art. Unless otherwise indicated herein, the term "include" shall mean "include, without limitation," and the term "or" shall mean non-exclusive "or" in the manner of "and/or."

Those skilled in the art will recognize that, in some embodiments, some of the operations described herein may be performed by human implementation, or through a combination of automated and manual means. When an operation is not fully automated, appropriate components of embodiments of the disclosure may, for example, receive the results of human performance of the operations rather than generate results through its own operational capabilities.

All references cited herein, including, without limitation, articles, publications, patents, patent publications, and patent applications, are incorporated by reference in their entireties for all purposes, except that any portion of any such reference is not incorporated by reference herein if it: (1) is inconsistent with embodiments of the disclosure expressly described herein; (2) limits the scope of any embodiments described herein; or (3) limits the scope of any terms of any claims recited herein. However, mention of any reference, article, publication, patent, patent publication, and patent application cited herein is not, and should not be taken as an acknowledgment or any form of suggestion that they constitute valid prior art or form part of the common general knowledge in any country in the world, or that they are disclose essential matter.

In the claims below, a claim n reciting "any one of the preceding claims starting with claim x," shall refer to any one of the claims starting with claim x and ending with the immediately preceding claim (claim n-1). For example, claim 35 reciting "The system of any one of the preceding claims starting with claim 28" refers to the system of any one of claims 28-34.

EMBODIMENTS

Below is a non-exhaustive summary of embodiments of the disclosure.

1. A crop production system for an indoor farm comprising a first assembly, the first assembly comprising:
   a. a first sub-assembly comprising a first plurality of arms radiating outward from a central portion, wherein
      i. each arm is separated from two adjacent arms of the first plurality of arms by respective angles;

ii. each arm has a first end proximal to the central portion and a second end distal to the central portion, and
iii. each arm is configured to support a plurality of plant growth modules; and
b. a mechanism for moving the plurality of plant growth modules in a first direction running from the first end to the second end of each arm of the first plurality of arms.

2. The system of embodiment 1, wherein the mechanism is operable to increase spacing in the first direction along each arm between adjacent plant growth modules of the plurality of plant growth modules coupled to the arm, and spacing between adjacent plant growth modules is non-decreasing as a function of distance from the central portion.
3. The system of embodiment 1, wherein the angles between adjacent arms depends at least in part upon expected growth rate of plants in the plurality of plant growth modules.
4. The system of embodiment 1, wherein the first plurality of arms is arranged in a first plane.
5. The system of embodiment 1, wherein the first plurality of arms is arranged in a horizontal plane.
6. The system of embodiment 1, wherein each arm of the first plurality of arms comprises a gutter.
7. The system of embodiment 1, wherein each arm of the first plurality of arms includes two openings at different lateral positions of the arm to allow for plant growth from the plurality of plant growth modules supported by the arm.
8. The system of embodiment 1, the first assembly comprising at least two sub-assemblies, including the first sub-assembly, wherein:
   a. each sub-assembly of the at least two sub-assemblies comprises a respective plurality of arms radiating outward from the central portion,
   b. each arm of each plurality of arms is separated from two adjacent arms of the same plurality of arms by respective angles;
   c. each plurality of arms of the at least two sub-assemblies of the first assembly lies in a plane parallel to an adjacent plurality of arms of the at least two sub-assemblies of the first assembly,
   d. each arm of each plurality of arms is configured to support a plurality of plant growth modules, and
   e. each arm of each plurality of arms has a first end proximal to the central portion and a second end distal to the central portion.
9. The system of embodiment 1, the first assembly comprising at least two sub-assemblies, including the first sub-assembly, wherein:
   a. each sub-assembly of the at least two sub-assemblies comprises a respective plurality of arms radiating outward from the central portion,
   b. each arm of each plurality of arms is separated from two adjacent arms of the same plurality of arms by respective angles;
   c. each arm of each plurality of arms is configured to support a plurality of plant growth modules,
   d. each arm of each plurality of arms has a first end proximal to the central portion and a second end distal to the central portion,
   e. each plurality of arms of the at least two sub-assemblies of the first assembly lies in a respective plane of a first plurality of planes, and
   f. the first plurality of planes radiate outward at different angles with respect to a longitudinal dimension of the central portion.
10. The system of embodiment 9, further comprising a second assembly, wherein:
    i. the second assembly comprises at least two sub-assemblies,
    ii. each sub-assembly of the at least two sub-assemblies of the second assembly comprises a respective plurality of arms radiating outward from a second central portion,
    iii. each arm of each plurality of arms of the at least two sub-assemblies of the second assembly has a first end proximal to the second central portion and a second end distal to the second central portion,
    iv. the second central portion is disposed proximal to the second ends of the arms of the first assembly and distal to the central portion of the first assembly,
    v. each arm of each plurality of arms of the at least two sub-assemblies of the second assembly is configured to support a plurality of plant growth modules,
    vi. each plurality of arms of the at least two sub-assemblies of the second assembly lies in a respective plane of a second plurality of planes, and
    vii. the second plurality of planes radiate outward at different angles with respect to a longitudinal dimension of the second central portion.
11. The system of any one of embodiments 8-10, wherein:
    a. the mechanism is operable to move a plurality of plant growth modules in a respective direction running from the first end to the second end of each arm of each plurality of arms.
12. The system of embodiment 11, wherein:
    a. for each arm, the mechanism is operable to increase spacing along a longitudinal dimension of the arm between adjacent plant growth modules of the plurality of plant growth modules supported by the arm, and
    b. spacing between the adjacent plant growth modules is non-decreasing as a function of distance from the first end of the arm.
13. The system of any one of embodiments 1 or 11, wherein the mechanism comprises at least one of a walking beam mechanism or a push-pull bar mechanism.
14. The system of any one of embodiments 1 or 11, wherein as the mechanism moves the plurality of plant growth modules, the plant growth modules pass through different environmental conditions.
15. The system of any one of embodiments 8-10, wherein the angles depend at least in part upon expected growth rate of plants in the plurality of plant growth modules.
16. The system of any one of embodiments 1, 8, 9, or 10, wherein the first ends of each plurality of arms are associated with planting zones, and the second ends of each plurality of arms are associated with harvest zones.
17. The system of embodiment 10, wherein the first and second assemblies are disposed side-by-side.
18. The system of embodiment 10, wherein the first and second assemblies are disposed vertically with respect to each other.

What is claimed is:
1. A crop production system for a controlled growing environment comprising a first assembly, the first assembly comprising at least two sub-assemblies, wherein:

a. each sub-assembly of the at least two sub-assemblies comprises a respective plurality of arms radiating outward from a central portion,
b. each arm of each plurality of arms is separated from two adjacent arms of the same plurality of arms by respective angles;
c. each arm of each plurality of arms has a first end proximal to the central portion and a second end distal to the central portion,
d. each arm of each plurality of arms is configured to support a corresponding plurality of plant growth modules,
e. the plurality of plant growth modules is movable in a first direction running from the first end to the second end of the corresponding arm of the plurality of arms, and
f. each sub-assembly of the at least two sub-assemblies radiates outward at different angles with respect to a longitudinal dimension of the central portion.

2. The system of claim 1, wherein the respective plurality of arms of each of the at least two sub-assemblies of the first assembly lies in a respective plane of a first plurality of planes.

3. The system of claim 1, wherein spacing increases in the first direction along each arm between adjacent plant growth modules of the plurality of plant growth modules coupled to the arm, the spacing between adjacent plant growth modules being non-decreasing as a function of distance from the central portion.

4. The system of claim 1, wherein the angles between adjacent arms depend at least in part upon expected growth rate of plants in the plurality of plant growth modules.

5. The system of claim 1, wherein each arm of each the first plurality of arms comprises a gutter.

6. The system of claim 1, wherein each arm of each plurality of arms includes two openings at different lateral positions of the arm to allow for plant growth from the plurality of plant growth modules supported by the arm.

7. The system of claim 1, further comprising a second assembly and a third assembly, wherein:
  i. the second and third assemblies each comprise at least two sub-assemblies,
  ii. each sub-assembly of the at least two sub-assemblies of the second and third assemblies comprises a respective plurality of arms radiating outward from a second central portion of the second assembly and a third central portion of the third assembly, respectively,
  iii. each arm of each plurality of arms of the at least two sub-assemblies of the second assembly has a first end proximal to the second central portion and a second end distal to the second central portion,
  iv. each arm of each plurality of arms of the at least two sub-assemblies of the third assembly has a first end proximal to the third central portion and a second end distal to the third central portion,
  v. the second central portion is disposed proximal to the second ends of the arms of the first assembly and distal to the central portion of the first assembly,
  vi. the third central portion is disposed proximal to the second ends of the arms of the second assembly and distal to the central portion of the second assembly,
  vii. each arm of each plurality of arms of the at least two sub-assemblies of the second and third assemblies is configured to support a plurality of plant growth modules,
  viii. each sub-assembly of the at least two sub-assemblies of the second assembly radiates outward at different angles with respect to a longitudinal dimension of the second central portion,
  ix. each sub-assembly of the at least two sub-assemblies of the third assembly radiates outward at different angles with respect to a longitudinal dimension of the third central portion, and
  x. the space between the first and third central portions defines a first inter-assembly plane,
  xi. the second central portion occupies a second inter-assembly plane different from and parallel to the first inter-assembly plane, and
  xii. the respective pluralities of arms of the first, second and third assemblies lie between the first and second inter-assembly planes.

8. The system of claim 7, wherein:
a. a plurality of plant growth modules is movable in a respective direction running from the first end to the second end of each arm of each plurality of arms.

9. The system of claim 7, wherein:
a. for each arm, spacing may be increased along a longitudinal dimension of the arm between adjacent plant growth modules of the plurality of plant growth modules supported by the arm, and
b. spacing between the adjacent plant growth modules is non-decreasing as a function of distance from the first end of the arm.

10. The system of claim 7, wherein the angles with respect to the longitudinal dimensions of the second and third central portions depend at least in part upon expected growth rate of plants in the plurality of plant growth modules.

11. The system of claim 7, wherein the first and second assemblies are disposed side-by-side.

12. The system of claim 7 wherein the first and second assemblies are disposed vertically with respect to each other.

13. The system of claim 7, wherein:
a. the respective plurality of arms of each of the at least two sub-assemblies of the second assembly lies in a respective plane of a second plurality of planes, and
b. the respective plurality of arms of each of the at least two sub-assemblies of the third assembly lies in a respective plane of a third plurality of planes.

14. The system of claim 1, wherein the mechanism comprises at least one of a walking beam mechanism or a push-pull bar mechanism.

15. The system of claim 1, wherein the plant growth modules pass through different environmental conditions as they slide.

16. The system of claim 1, wherein the first ends of each plurality of arms are associated with planting zones, and the second ends of each plurality of arms are associated with harvest zones.

* * * * *